(12) United States Patent
Yamazaki

(10) Patent No.: US 7,451,274 B2
(45) Date of Patent: Nov. 11, 2008

(54) MEMORY CONTROL DEVICE, MOVE-IN BUFFER CONTROL METHOD

(75) Inventor: Iwao Yamazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 330 days.

(21) Appl. No.: 10/995,560

(22) Filed: Nov. 24, 2004

(65) Prior Publication Data

US 2006/0026363 A1    Feb. 2, 2006

(30) Foreign Application Priority Data

Jul. 30, 2004    (JP)    ............................. 2004-224854

(51) Int. Cl.
    *G06F 13/14*    (2006.01)
(52) U.S. Cl. .................. 711/119; 711/133; 711/137; 711/158
(58) Field of Classification Search ................ 711/119, 711/133, 137, 158
    See application file for complete search history.

(56) References Cited

U.S. PATENT DOCUMENTS

| | | | | |
|---|---|---|---|---|
| 5,551,010 A | * | 8/1996 | Iino et al. .................. 711/169 |
| 5,603,004 A | * | 2/1997 | Kurpanek et al. ........... 711/118 |
| 5,828,860 A | * | 10/1998 | Miyaoku et al. ............. 712/207 |
| 6,073,215 A | * | 6/2000 | Snyder ....................... 711/137 |

FOREIGN PATENT DOCUMENTS

| | | |
|---|---|---|
| JP | 64-46145 | 2/1989 |
| JP | 64-46145 A | 2/1989 |
| JP | 4-21044 A | 1/1992 |
| JP | 8-16468 A | 1/1996 |

* cited by examiner

*Primary Examiner*—Gary J Portka
*Assistant Examiner*—Yong J. Choe
(74) *Attorney, Agent, or Firm*—Staas & Halsey LLP

(57) ABSTRACT

A central processor executes at least a load command, a store command, and a prefetch command based on an out-of-order processing for processing commands by changing the order of executing the commands. A valid move-in buffer (MIB) detector detects the number of primary cache MIBs that hold requests of a primary cache for reference to data stored in the main storage. An MIB controller controls to hold in the primary cache MIBs the reference requests according to the load command or the store command in preference to the reference requests according to the prefetch command, when the detected number of the cache buffers reaches a predetermined number.

8 Claims, 8 Drawing Sheets

MEMORY CONTROL DEVICE, MOVE-IN BUFFER CONTROL METHOD

BACKGROUND OF THE INVENTION

1) Field of the Invention

The present invention relates to a memory control device, a move-in buffer control method, and a program. More particularly, the present invention relates to a memory control device and a move-in buffer control method that can efficiently control a reference to data stored in a main storage.

2) Description of the Related Art

Conventionally, the operation speed of a central processor is much faster than the operation speed of a main storage, which raises a problem that when the main storage is referred to, the operation of the central processor must wait for a long time.

In order to solve this problem, there is disclosed a conventional technique of avoiding a stalled execution of a central processor due to reference to data stored in a main storage, using a prefetch command to fetch data to be used later to a cache in advance. In other words, when a demand request, which is a processing of the central processor to wait for a completion of reference to data stored in a cache or the main storage, is executed, such as a load command to store data fetched from the cache or the main storage into an operation device, and a store command to write an operation result into the cache or the main storage, a cache line that is necessary for the demand request is prepared on the cache in advance based on the prefetch command. With this arrangement, the stalled execution of the central processor due to the reference to data stored in the main storage can be avoided.

There is also disclosed a conventional technique of shortening the time of waiting for fetching data from the main storage, that is, memory latency, by executing a request for reference to data stored in the cache or the main storage by an out-of-order processing. In other words, in the out-of-order processing, executable commands are executed first instead of executing the commands in the sequence of a program. For example, while fetching of data from the main storage is awaited due to a cache miss caused by a precedent command, a succeeding command is executed. When the succeeding command causes a cache hit, the data fetched from the cache is stored into a register of the operation device. An operation is carried out using the stored data, and the execution of the program is progressed within a possible range. When the succeeding command causes a cache miss, a necessary cache line is fetched from the main storage. When a plurality of cache misses are processed simultaneously, the memory latency can be shortened, as compared with the case of sequentially processing cache misses.

A cache MIB ("move-in buffer" is hereinafter referred to as an MIB (Move In Buffer)) is provided for each cache. In fetching a cache line from the main storage due to the occurrence of a cache miss, by storing a physical address of the cache line in the reference request, the time from the assigning of the cache MIBs till the completion of the transfer to the cache can be shortened. Requesting for a plurality of references to the same address is avoided. Unnecessary assigning of the cache MIBs is avoided, and unnecessary use of data transfer buses due to data transfer is avoided.

On the other hand, when referring to much data according to a program of carrying out operation by referring to a multidimensional array, many cache lines must be fetched to the primary cache based on a prefetch command. Therefore, depletion of the primary cache MIBs of the primary cache occurs frequently. In this case, even if a demand request tries to assign the primary cache MIBs, the primary cache MIBs cannot be assigned. Therefore, the execution of the demand request must wait until some primary cache MIBs become available. In other words, based on the prefetch request for preparing data that is considered to become necessary later, a demand request that requires an immediate completion of the execution is interrupted. As a result, reference to data stored in the main storage cannot be controlled efficiently.

When the succeeding load requests or store requests assign the entire primary cache MIBs based on the out-of-order processing, a load request or a store request that must be executed first in executing the command cannot assign the primary cache MIBs, and the execution of the command is interrupted. As a result, reference to data stored in the main storage cannot be controlled efficiently.

When the succeeding load requests or store requests assign the primary cache MIBs first based on the out-of-order processing, and when a slashing of the cache line occurs, execution of a load request or a store request that must be executed first in executing the command must wait for a long time. As a result, reference to data stored in the main storage cannot be controlled efficiently.

Japanese Patent Application Laid-Open No. H4-21044 discloses a conventional technique of improving system performance by increasing the number of times of prefetching commands to be loaded on the cache more than the number of times of prefetching operands. Japanese Patent Application Laid-Open No. H6-90681 discloses a conventional technique of executing prefetch by an optional number of times requested within a maximum permissible number of times of block fetch. Japanese Patent Application Laid-Open No. H8-16468 discloses a conventional technique of preventing depletion of the primary cache MIBs by deleting unnecessary prefetch.

According to the conventional technique disclosed in Japanese Patent Application Laid-Open No. H4-21044, system performance can be improved by increasing the number of prefetching commands to be loaded on the cache to more than the number of prefetching operands. According to the conventional technique disclosed in Japanese Patent Application Laid-Open No. 64-46145, prefetch can be executed by an optional number of times requested within a maximum permissible number of times of block fetch. According to the conventional technique disclosed in Japanese Patent Application Laid-Open No. H8-16468, depletion of the primary cache MIBs can be prevented by deleting unnecessary prefetch.

However, according the conventional techniques disclosed in the above-mentioned patent application, exclusive use of the primary cache MIBs by the prefetch command cannot be avoided. Therefore, demand request that requires an immediate completion of the execution is interrupted by the prefetch request for preparing data that is considered to become necessary later. As a result, the problem that reference to data stored in the main storage cannot be controlled efficiently remains unsolved.

When the succeeding load requests or store requests assign the entire primary cache MIBs based on the out-of-order processing, a load request or a store request that must be executed first in executing the command cannot assign the primary cache MIBs, and the execution of the command is interrupted. As a result, the problem that reference to data stored in the main storage cannot be controlled efficiently remains unsolved.

When the succeeding load requests or store requests-assign the primary-cache MIBs first based on the out-of-order processing, and when a slashing of the cache line occurs, execution of a load request or a store request that must be executed first in executing the command must wait for a long time. As a result, the problem that reference to data stored in the main storage cannot be controlled efficiently remains unsolved.

SUMMARY OF THE INVENTION

It is an object of the present invention to solve at least the problems in the conventional technology.

A memory control device according to an aspect of the present invention is provided between a main storage and a command processing device or an operation device included in a central processor, the memory control device controls the command processing device or the operation device in reference to data stored in the main storage, and includes a plurality of caches that store data stored in the main storage and address information corresponding to the data; and a plurality of cache buffers that hold address information of requests of the caches for reference to data stored in the main storage. The central processor executes at least a load command to store data from the caches or the main storage into the operation device, a store command to write a result of an operation carried out by the operation device into the caches or the main storage, and a prefetch command to store data stored in the main storage into the caches, based on an out-of-order processing for processing commands by changing the order of executing the commands. The memory control device includes a valid MIB detector that detects number of the cache buffers that hold requests of the cache for reference to data stored in the main storage; and a buffer controller that controls to hold in the cache buffers the reference requests according to the load command or the store command in preference to the reference requests according to the prefetch command, when the detected number of the cache buffers reaches a predetermined number.

A method of controlling a move-in buffer according to another aspect of the present invention is executed on a memory control device provided between a main storage and a command processing device or an operation device included in a central processor, the memory control device controlling the command processing device or the operation device in reference to data stored in the main storage, and including a plurality of caches that store data stored in the main storage and address information corresponding to the data; and a plurality of cache buffers that hold address information of requests of the caches for reference to data stored in the main storage. The central processor executes at least a load command to store data from the caches or the main storage into the operation device, a store command to write a result of an operation carried out by the operation device into the caches or the main storage, and a prefetch command to store data stored in the main storage into the caches, based on an out-of-order processing for processing commands by changing the order of executing the commands. The method includes detecting number of the cache buffers that hold requests of the cache for reference to data stored in the main storage; and controlling to hold in the cache buffers the reference requests according to the load command or the store command in preference to the reference requests according to the prefetch command, when the number of the cache buffers detected reaches a predetermined number.

The other objects, features, and advantages of the present invention are specifically set forth in or will become apparent from the following detailed description of the invention when read in conjunction with the accompanying drawings.

DETAILED DESCRIPTION

Exemplary embodiments of a memory control device, a method of controlling a move-in buffer, and a computer product according to the present invention will be explained in detail with reference to the accompanying drawings.

A first embodiment relates to application of a memory control device according to the present invention to a computer system. A second embodiment relates to execution of a computer program that has the same function as that of the memory control device.

In a first embodiment, application of a memory control device according to the present invention to a computer system is explained. The present embodiment is explained in the order of outline and main characteristics of the memory control device, configuration of the computer system, MIB control of a store command and a fetch processing request, MIB control of a stalled execution of a load command and a store command, MIB control procedure of a prefetch command, MIB control procedure of an out-of-order processing, and MIB control procedure of a stalled execution of a load command and a store command.

Figure 1:
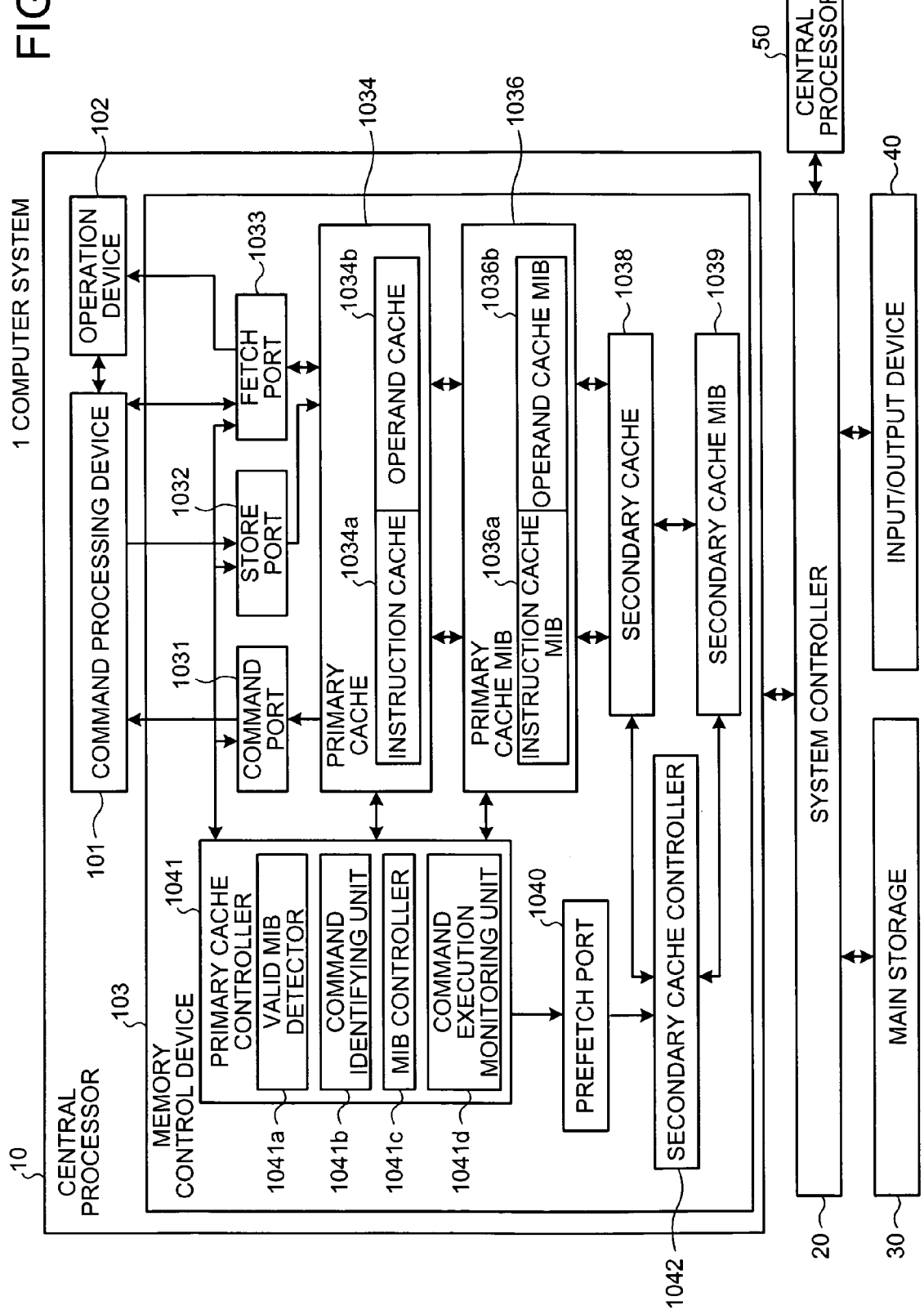
FIG. 1 is a functional block diagram of a configuration of a computer system according to a first embodiment of the present invention.

Outline and main characteristics of a memory control device 103 are explained with reference to FIG. 1. FIG. 1 is a functional block diagram of a configuration of a computer system 1 according to the first embodiment.

A memory control device 103 according to the present invention has a primary cache 1034 and a secondary cache 1038 that are provided between a command processing device 101 and an operation device 102 included in a main storage 30 and a central processor 10, control reference from the command processing device 101 and the operation device 102 to data stored in the main storage 30, and store data stored in the main storage 30 and address information corresponding to the data, and primary cache MIBs 1036 and secondary cache MIBs 1039 that respectively hold address information of requests of the primary cache 1034 and the secondary cache 1038 for reference to data stored in the main storage 30. The memory control device 103 can efficiently control reference to data stored in the main storage 30.

The central processor 10 executes at least a load command to store data from the primary cache 1034, the secondary cache 1038, or the main storage 30 into the operation device 102, a store command to write a result of operation carried out by the operation device 102 into the primary cache 1034, the secondary cache 1038, or the main storage 30, and a prefetch command to store data stored in the main storage 30 into the primary cache 1034 or the secondary cache 1038, based on an out-of-order processing for processing commands by changing the order of executing the commands. A valid MIB detector 1041a detects the number of the primary cache MIBs 1036 that hold requests of the primary cache 1034 for reference to data stored in the main storage 30. An MIB controller 1041c controls to hold the reference requests according to the load command or the store command into the primary cache MIBs 1036 in preference to the reference requests according to the prefetch command, when the detected number of the cache buffers reaches a predetermined number. Therefore, the memory control device 103 can avoid interruption of a load command or a store command that requires an immediate completion of the execution by the prefetch request to prepare data that is considered to become necessary later. Consequently, reference to data stored in the main storage 30 can be controlled efficiently.

A configuration of the computer system 1 according to the first embodiment is explained with reference to FIG. 1. The computer system 1 has central processors 10 and 50, a system controller 20, the main storage 30, and an input/output device 40. Each of the central processors 10 and 50 stores a result of data processing into the main storage 30 again according to a program stored in the main storage 30, and has a command processing device 101, an operation device 102, and the memory control device 103.

The command processing device 101 controls the whole central processor 10, and reads a command that forms a program from the main storage 30, decodes the read command, issues a request to each device based on the decoded command, and executes the program. The operation device 102 reads data from the main storage 30, and executes various kinds of operations based on the read data. The memory control device 103 is provided between the command processing device 101, the operation device 102, and the main storage 30, and controls the command processing device 101 and the operation device 102 in their reference to data stored in the main storage 30. The memory control device 103 is explained in further detail after the explanation of the configuration of the computer system 1.

The system controller 20 controls the whole computer system 1 that consists of the central processors 10 and 50, the main storage 30, and the input/output device 40, which is a multi-processor. The main storage 30 stores programs and data, and includes semiconductor memories such as an SRAM (Static Random Access Memory), and a DRAM (Dynamic Random Access Memory).

The input/output device 40 includes an input device such as a keyboard and a mouse that a user uses to input requests and instructions, an external storage such as a floppy (a registered trade name) disk and an HDD (Hard Disk Drive) into which programs and data are input, and an output device such as an LCD (Liquid Crystal Display) and a printer that outputs data.

The memory control device 103 is explained in detail next. The memory control device 103 has a command port 1031, a store port 1032, a fetch port 1033, the primary cache 1034, the primary cache MIB 1036, the secondary cache 1038, the secondary cache MIB 1039, a prefetch port 1040, a primary cache controller 1041, and a secondary cache controller 1042.

The command port 1031 is a buffer that temporarily stores a command of a series of programs fetched from the primary cache 1034. The store port 1032 is a buffer that temporarily stores a store command to instruct the writing of an operation result into the primary cache 1034, the secondary cache 1038, or the main storage 30. The fetch port 1033 is a buffer that temporarily stores a fetch processing request read from the primary cache 1034, the secondary cache 1038, or the main storage 30.

Figure 2:
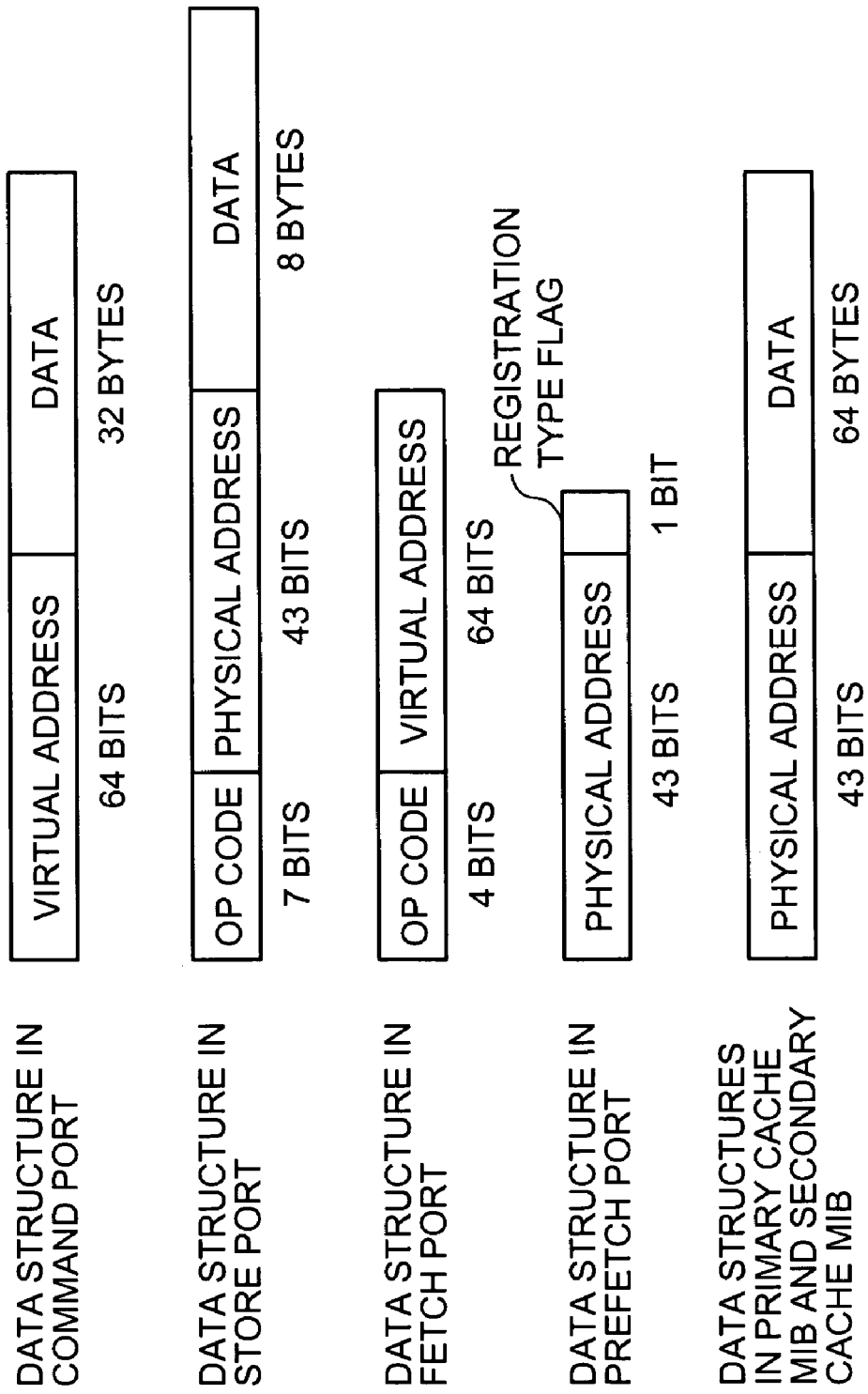
FIG. 2 is an example of data structures in a command port, a store port, a fetch port, a primary cache MIB and a secondary cache MIB, and a prefetch port shown in FIG. 1.

Examples of data structures in a command port 1031, a store port 1032, a fetch port 1033, the primary cache MIBs 1036 and the secondary cache MIBs 1039, and a prefetch port 1040 shown in FIG. 1 are explained with reference to FIG. 2. FIG. 2 is an example of data structure in the command port 1031, the, store port 1032, the fetch port 1033, the primary cache MIB 1036 and the secondary cache MIB 1039, and the prefetch port 1040 shown in FIG. 1. As shown in the drawing, data in the command port 1031 includes a 64-bit virtual address, and 32-byte data. Data in the store port 1032 includes a 7-bit OP (operation) code, a 43-bit physical address, and 8-byte data. Data in the fetch port 1033 includes a 4-bit OP code, and a 64-bit virtual address. Data in the primary cache MIBs 1036 and the secondary cache MIBs 1039 includes a 43-bit physical address and 64-byte data. Data in the prefetch port 1040 includes a 43-bit physical address and a 1-bit registration type flag, respectively. The registration type flag is used to identify a registration type, that is, a shared type or an exclusive type, of data to the cache.

Referring back to FIG. 1, the primary cache 1034 stores data from the secondary cache 1038, and a physical address corresponding to the part of the data, and has an instruction cache 1034a that stores a program, and an operand cache 1034b that stores data. The primary cache MIB 1036 is a buffer that stores a physical address of a cache line as a reference request, at the time of achieving a move-in of the cache line from the secondary cache 1038 that causes a cache miss, that is, at the time of referring to data stored in the secondary cache 1038. The primary cache MIB 1036 has an instruction cache MIB 1036a that stores a physical address of a program, and an operand cache MIB 1036b that stores a physical address of data. Each of the instruction cache MIB 1036a and the operand cache MIB 1036b has four MIBs, for example. The primary cache 1034 cannot request the secondary cache 1038 for a move-in of data to the primary cache 1034 more than the number of MIBs in the primary cache MIB 1036.

The secondary cache 1038 stores a part of a program or data stored in the main storage 30. The secondary cache MIB 1039 is a buffer that stores a physical address of a cache line as a reference request at the time of referring to data store in the main storage 30 when a cache miss occurs. The secondary cache MIB 1039 has 16 MIBs, for example. The secondary cache 1038 cannot request the main storage 30 for a reference of data to the to the main storage 30 more than the number of the secondary cache MIB 1039.

The prefetch port 1040 is a buffer into which the primary cache controller 1041 transfers a data reference request from the main storage 30 to the secondary cache 1038 when there is no room in the primary cache MIBs 1036. The primary cache controller 1041 requests the secondary cache MIB 1039 to prefetch separately from a route via the primary cache MIB 1036.

More specifically, when there is no room in the primary cache MIBs 1036 and when a subsequent command causes a cache miss, the primary cache controller 1041 requests for a move-in from the main storage 30 to the secondary cache using the prefetch port 1040. The prefetch port 1040 cannot achieve a move-in to the primary cache 1034. However, when there is room in the primary cache 1034 afterward, the primary cache controller 1041 requests a move-in to the primary cache 1034 via the primary cache MIBs 1036.

In other words, the prefetch port 1040 starts a move-in to-the secondary cache 1038 in advance. With this arrangement, when the prefetch port 1040 starts a move-in to the primary cache 1034 as soon as there is room in the primary cache MIB 1036, the cache line already reaches the secondary cache or reaches near the secondary cache. Therefore, the prefetch port 1040 can shorten the time, i.e., cache miss latency, from the assigning of the primary cache MIB 1036 to the completion of the move-in.

The primary cache controller 1041 controls the command port 1031, the store port 1032, the fetch port 1033, the primary cache 1034, the primary cache MIBs 1036, and the prefetch port 1040, and has the valid MIB detector 1041a, a command identifying unit 1041b, the MIB controller 1041c, and a command execution monitoring unit 1041d.

Figure 3:
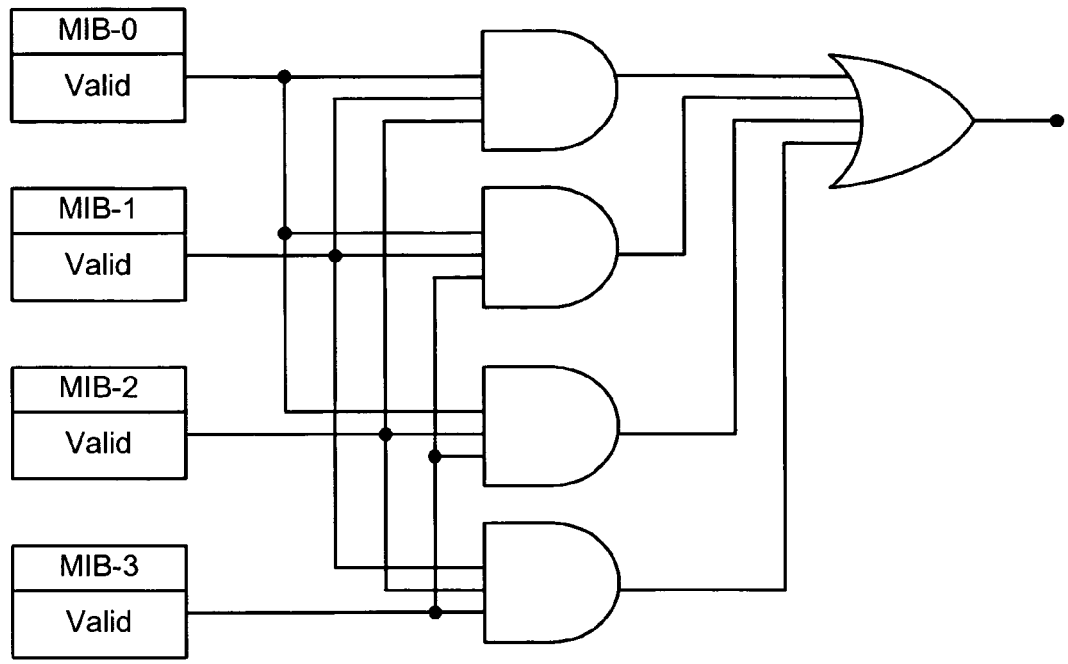
FIG. 3 is a functional block diagram of a configuration of a valid MIB detector shown in FIG. 1.

The valid MIB detector 1041a detects the number of the MIBs that hold requests of the primary cache for reference to data stored in the main storage 30. A configuration of the valid MIB detector 1041a shown in FIG. 1 is explained with reference to FIG. 3. FIG. 3 is a functional block diagram of the configuration of the valid MIB detector 1041a shown in FIG. 1.

As shown in the drawing, each of the primary cache MIBs 1036 has a valid flag that indicates that the MIB is busy. When this valid flag is "1", this indicates that the corresponding MIB is busy. The valid MIB detector 1041a uses outputs of the valid flags as inputs to four AND circuits, regarding four combinations that indicate that at least three MIBs are valid out of the four MIBs. When outputs from the four AND circuits are input to one OR circuit, the valid MIB detector 1041a detects that optional three MIBs out of the four MIBs are busy when an output from the OR circuit is "1".

Referring back to FIG. 1, the command identifying unit 4041b identifies at least a load command to store data from the primary cache 1034, the secondary cache 1038, or the main storage 30 into the operation device 102, a store command to write a result of an operation carried out by the operation device 102 into the primary cache 1034, the secondary cache 1038, or the main storage 30, and a prefetch command to store data into the primary cache 1034 or the secondary cache 1038. For example, the command identifying unit 1041b refers to the OP code (refer to FIG. 2) that identifies a command flowing through a pipeline of the primary cache 1034, to confirm that this command is a prefetch command. Further, the command identifying unit 1041b refers to a pipeline identifier that identifies processing flowing through the pipeline of the primary cache 1034, to confirm that this processing is prefetch processing that is processed via the prefetch port 1040.

The MIB controller 1041c controls to hold the reference requests according to the load command or the store command into the primary cache MIBs 1036 in preference to the reference requests according to the prefetch command, when the number of the MIBs detected by the valid MIB detector 1041a reaches a predetermined number. For example, when three MIBs of the primary cache MIBs 1036 are already busy, the MIB controller 1041c prohibits the assigning of an additional MIB for the prefetch command.

Figure 4:
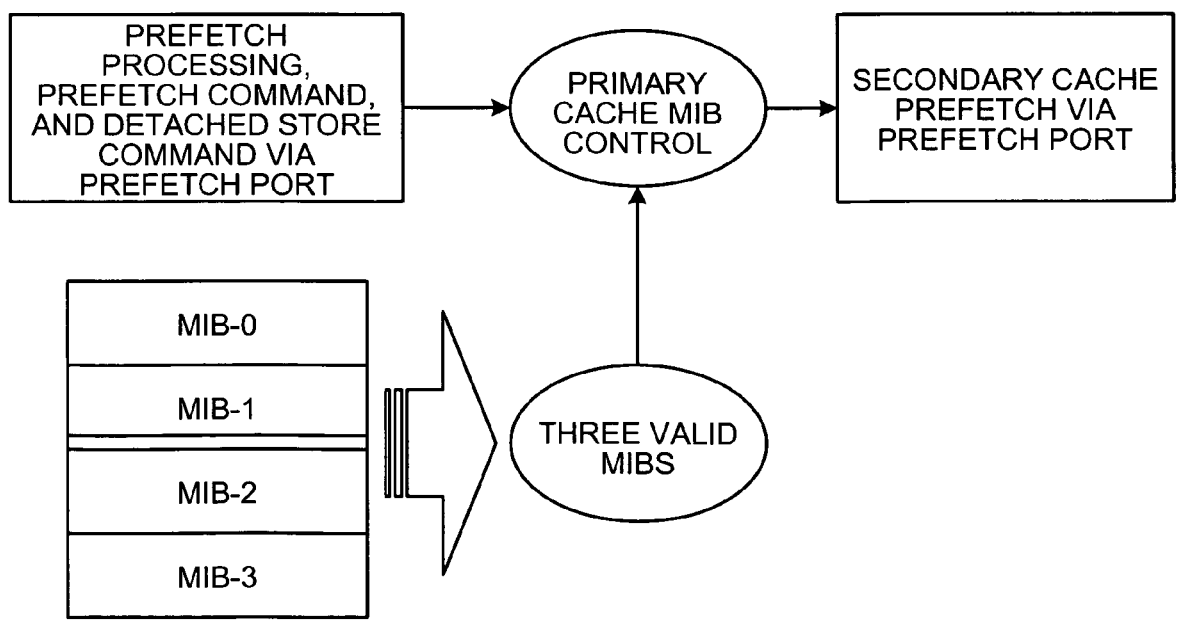
FIG. 4 depicts an MIB control of a prefetch command and a store command carried out by an MIB controller shown in FIG. 1.

The MIB controller 1041c controls to hold reference requests according to a load command or a store command into the primary cache MIBs 1036 based on the order of executing the commands. The MIB control of a prefetch command and a store command carried out by the MIB controller 1041c shown in FIG. 1 is explained with reference to FIG. 4. FIG. 4 depicts the MIB control of a prefetch command and a store command carried out by the MIB controller 1041c shown in FIG. 1.

As shown in FIG. 4, when a request that is input to the pipeline of the primary cache 1034 is a prefetch command, a prefetch processing to the secondary cache 1034 via the prefetch port 1040, or a detached store command, and also when the valid MIB detector 1041a detects that three MIBs are busy, the MIB controller 1041c prohibits the assigning of an additional MIB even if these processing cause a cache miss. The MIB controller 1041c sets an MIB-BUSY signal ON to indicate that the four out of four MIBs are busy, and prohibits the assigning of an additional MIB from the primary cache MIBs 1036. At the same time, the MIB controller 1041c transfers a move-in request to the secondary cache 1038 via the prefetch port 1040. According to the detached store command, when a store command causes a cache miss, the store command is set to wait for a completion. When there is room in the primary cache MIBs 1036, a move-in request is issued. After a store permission is issued, a writing to the primary cache memory 1034, the secondary cache memory 1036, or the main storage 30 is executed.

As explained above, the MIB controller 1041c can shorten the cache miss latency by executing a prefetching of data to the secondary cache 1038 via the prefetch port 1040, while avoiding the exclusive use of the primary cache MIBs 1036 by the move-in request for prefetch. The MIB control of a store command and a fetch command, and the MIB control of a stalled execution of a load command and a store command are explained in detail later.

Referring back to FIG. 1, the command execution monitoring unit 1041d monitors updating of a TOQ (Top Of Queue, that is, a request that must be processed first) of a store command and a fetch processing request that are stored in the store port 1032 and the fetch port 1033. When the store port 1032 or the fetch port 1033 is released, a release signal is set ON, and the TOQ of the store port 1032 and the TOQ of the fetch port 1033 are updated to indicate the store port 1032 and the fetch port 1033 that are to be released next.

(3) MIB Control of a Store Command and a Fetch Processing Request

The MIB control of a store command is explained next. The primary cache controller 1041 confirms presence of an exception in the store command, that is, disapproval of access in the page attribute of an address conversion buffer, and notifies the confirmation result to the command processing device 101. When no exception occurs in the store command, and when store data is already-output to the memory control device 103, with a store command at the head during the execution, the command processing device 101 outputs a store permission for the store command to the memory control device 103.

At this point, a store domain is already mounted or is not mounted yet on the primary cache 1035. When a store domain is not present in the primary cache 1034, the primary cache controller 1041 inputs a request called ST1-REQ to the pipeline of the primary cache 1034. When a cache miss is found as a result of searching for a cache tag, the primary cache controller 1041 assigns an MIB, and requests for fetching a cache line from the secondary cache into the primary cache 1034.

Upon registration of an additional cache in the primary cache 1034, the primary cache controller 1041 again inputs ST1-REQ to the pipeline of the primary cache 1034, searches for a cache tag, confirms presence or absence of a cache data miss, and determines whether data can be written into the primary cache 1034. When data can be written into the primary cache 1034, the primary cache controller 1041 inputs a request called ST2-REQ to the pipeline of the primary cache 1034, reflects store data to the primary cache 1034, and releases the store port 1032 to which ST2-REQ is allocated.

As explained above, although out-of-order processing is possible for ST1-REQ, when a slashing occurs due to a plurality of ST1-REQs in the store port 1032, assigning of MIBs according to the TOQ in the store port 1032 is inhibited. The primary cache controller 1041 confirms execution of ST1-REQ with the pipeline identifier that flows through the pipeline, and confirms the state of the MIBs.

When a request that flows through the pipeline is ST1-REQ, when three primary cache MIBs 1036 are occupied, and when a store command that is executed is not a TOQ in the store port 1032, the primary cache controller 1041 sets an MIB-BUSY signal ON and executes the TOQ with priority even if a cache miss occurs. With this arrangement, even if a slashing occurs between store commands that receive store permission, MIBs can be assigned from the TOQ by avoiding the slashing, and the store command can be completed.

The MIB control of a fetch command is explained next. When it is confirmed based on a pipeline identifier that a request that flows through the pipeline is input from the fetch port 1033, when three primary cache MIBs 1036 are occupied, and when a fetch command that is executed is not a TOQ in the fetch port 1033, the primary cache controller 1041 sets an MIB-BUSY signal ON and executes the TOQ with priority even if a cache miss occurs. With this arrangement, the primary cache controller 1041 prohibits the assigning of an additional primary cache MIB 1036, and starts a prefetch to the secondary cache 1038. As a result, even when a request cannot assign the primary cache MIBs 1036, a request is sent to the secondary cache 1038 to assign the secondary cache MIBs 1039.

As explained above, the primary cache controller 1041 executes the prefetching of data to the secondary cache 1038, by avoiding such a situation that a reference to a memory domain in the secondary cache 1038 according to requests other than the TOQ in the fetch port 1033 occupies the primary cache MIBs 1036. With this arrangement, a prefetch effect is obtained. At the same time, a slashing between the prefetch ports 1033 can be prevented.

The MIB control of a stalled execution of a load command and a store command, that is, the control to prevent a hang-up, is explained next. When a release signal is OFF and also when valid commands are accumulated in the store port 1032 and the fetch port 1033, the command execution monitoring unit 1041d adds hang-up counters held by the store port 1032 and the fetch port 1033 respectively. In other words, when there is a port waiting for release upon completion of the execution of a command, and when the port is not released, the command execution monitoring unit 1041d adds the hang-up counter. When the hang-up counter exceeds a predetermined threshold value, for example, 2,000 cycles, the command execution monitoring unit 1041d assumes that a hang-up occurs in the store port 1032 or the fetch port 1033. The MIB controller 1041c then prohibits the assigning of the primary cache MIBs 1036 by commands other than the TOQ in the store port 1032 or the fetch port 1033.

The command execution monitoring unit 1041d holds a store command that receives a write permission as a hang-up detection condition, for the store port 1032, and monitors a state of inability of writing to the primary cache 1034 or the main storage 30. With this arrangement, when the hang-up counter of the store port 1032 exceeds a predetermined threshold value, for example, 2,000 cycles, and when the store port 1032 is considered to be hung up, all commands stored in the fetch port 1033 are guaranteed to be processed after the TOQ in the store port 1032. Therefore, when the hang-up counter of the store port 1032 exceeds a predetermined threshold value, the MIB controller 1041c prohibits the assigning of the primary cache MIBs 1036 by all the requests that are input from the fetch port 1033 to the pipeline and all the requests that are input from the store port other than the TOQ.

As explained above, when the command execution monitoring unit 1041d detects a hang-up, the MIB controller 1041c shifts the processing from the out-of-order processing to the sequential processing. Based on this, the processing of at least one command can be completed which allows the TOQ in the store port 1032 to be updated, which solves the hang-up in the store port 1032 or the fetch port 1033. As a result, a store command in the store port 1032 can quickly assign MIBs, and an operation state of achieving maximum performance can be restored.

Figure 5:
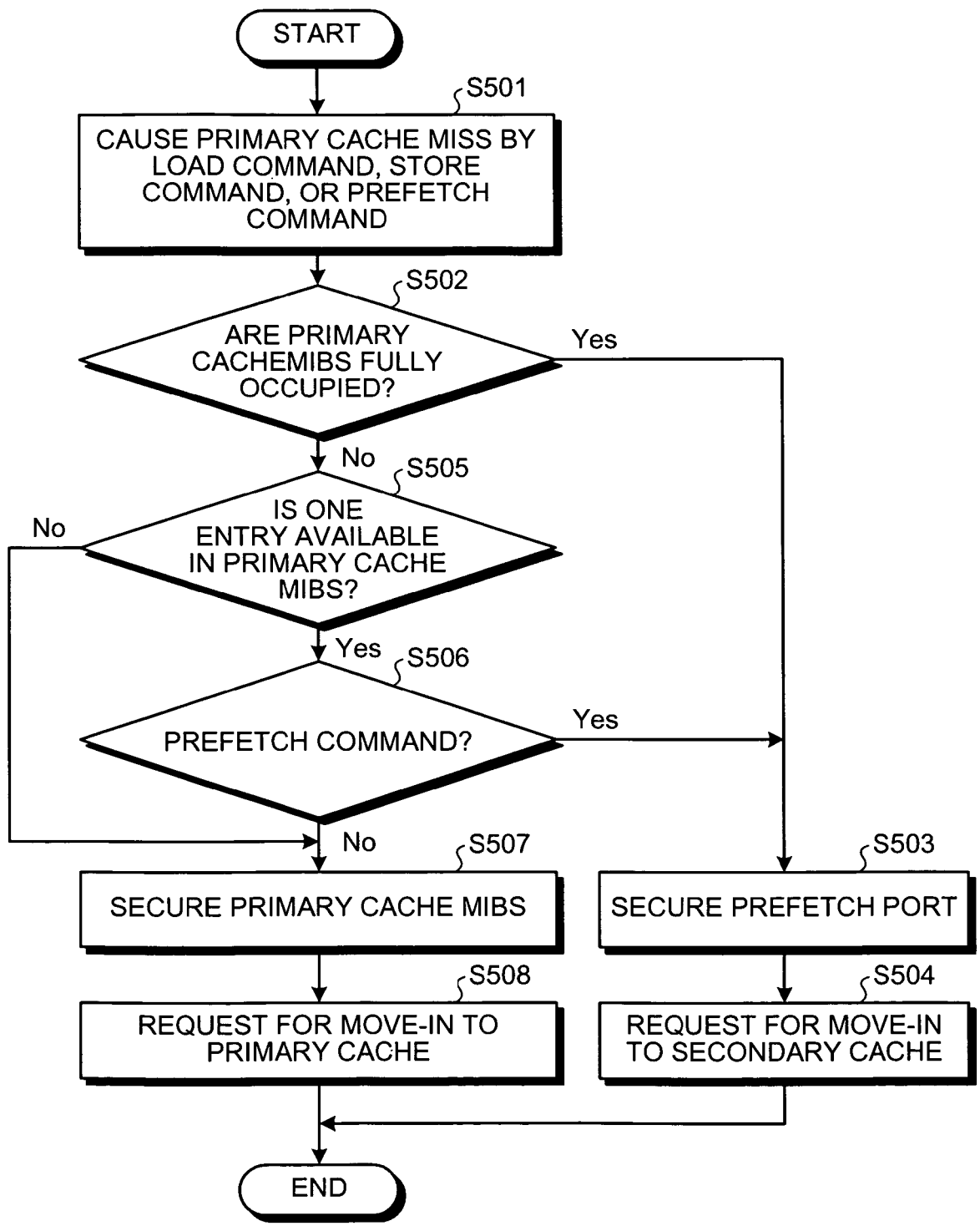
FIG. 5 is a flowchart of an MIB control procedure of a prefetch command by the MIB controller shown in FIG. 1.

The MIB control procedure of a prefetch command by the MIB controller 1041c shown in FIG. 1 is explained next with reference to FIG. 5. FIG. 5 is a flowchart of the MIB control procedure of a prefetch command by the MIB controller 1041c shown in FIG. 1. As shown in the drawing, when any one of a load command, a store command, and a prefetch command that is input to the pipeline of the primary cache 1034 causes a cache miss (step S501), the MIB controller 1041c confirms with the valid MIB detector 1041a whether the primary cache MIBs 1036 are fully occupied (step S502). The store command includes a detached store command.

When the primary cache MIBs 1036 are fully occupied (Yes at step S502), the MIB controller 1041c assigns the prefetch port 1040 (step S503), and requests for a move-in to the secondary cache 1038 (step S504).

On the other hand, when the primary cache MIBs 1036 are not fully occupied (No at step S502), the MIB controller 1041c further confirms with the valid MIB detector 1041a whether the number of available entry is one in the primary cache MIBs 1036 (step S505).

When two or more entries are available in the primary cache MIBs 1036 (No at step S505), the MIB controller 1041c assigns the primary cache MIBs 1036 (step S507), and requests for a move-in to the primary cache 1034 (step S508).

On the other hand, when one entry is available in the primary cache MIBs 1036 (Yes at step S505), the MIB controller 1041c further confirms whether the command that causes a primary cache miss is a prefetch command (step S506).

When the command that causes a primary cache miss is a prefetch command (Yes at step S506), the MIB controller 1041c assigns the prefetch port 1040 (step S503), and requests for a move-in to the secondary cache 1038 (step S504).

On the other hand, when the command that causes a primary cache miss is not a prefetch command (No at step S506), the MIB controller 1041c assigns the primary cache MIBs 1036 (step S507), and requests for a move-in to the primary cache 1034 (step S508).

As explained above, according to the present procedure, when the command that is input to the pipeline of the primary cache 1034 is a prefetch command, and also when one entry is available in the MIBs, the MIB controller 1041c prohibits the assigning of the primary cache MIBs 1036 for the prefetch command. The MIB controller 1041c assigns the prefetch port 1040, and requests for a move-in to the secondary cache 1038. Therefore, the memory control device 103 can obtain the effect of the prefetch while avoiding the exclusive use of the primary cache MIBs 1036 by the prefetch command. The command that is input to the pipeline of the primary cache 1034 includes a request for a prefetch processing via the prefetch port using a pipeline identifier.

Figure 6:
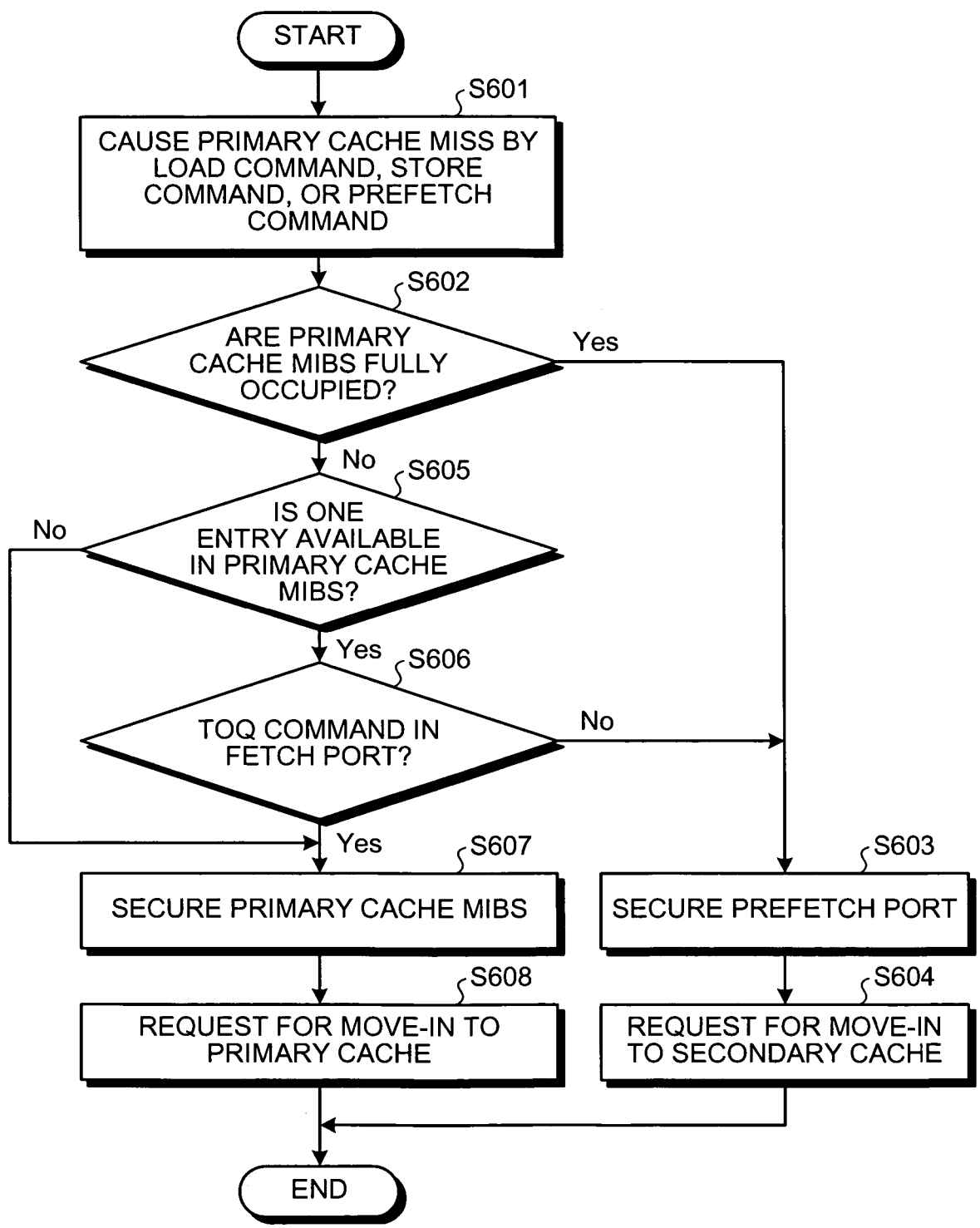
FIG. 6 is a flowchart of an MIB control procedure of an out-of-order processing by the MIB controller shown in FIG. 1.

The MIB control procedure of an out-of-order processing by the MIB controller 1041c shown in FIG. 1 is explained next with reference to FIG. 6. FIG. 6 is a flowchart of the MIB control procedure of an out-of-order processing by the MIB controller 1041c shown in FIG. 1. As shown in the drawing, when any one of a load command, a store command, and a prefetch command that is input to the pipeline of the primary cache causes a primary cache miss (step S601), the MIB controller 1041c confirms with the valid MIB detector 1041a whether the primary cache MIBs 1036 are fully occupied (step S602). The store command includes a detached store command.

When the primary cache MIBs 1036 are fully occupied (Yes at step S602), the MIB controller 1041c assigns the prefetch port 1040 (step S603), and requests for a move-in to the secondary cache 1038 (step S604).

On the other hand, when the primary cache MIBs 1036 are not fully occupied (No at step S602), the MIB controller 1041c further confirms with the valid MIB detector 1041a whether the number of available entry is one in the primary cache MIBs 1036 (step S605).

When two or more entries are available in the primary cache MIBs 1036 (No at step S605), the MIB controller 1041c assigns the primary cache MIBs 1036 (step S607), and requests for a move-in to the primary cache 1034 (step S608).

On the other hand, when one entry is available in the primary cache MIBs 1036 (Yes at step S605), the MIB controller 1041c further confirms whether the command that causes a primary cache miss is a command of the TOQ in the fetch port 1033 (step S606).

When the command that causes a primary cache miss is a command of the TOQ in the fetch port 1033 (Yes at step S606), the MIB controller 1041c assigns the primary cache MIBs 1036 (step S607), and requests for a move-in to the primary cache 1034 (step S608).

On the other hand, when the command that causes a primary cache miss is not a command of the TOQ in the fetch port 1033 (No at step S606), the MIB controller 1041c assigns the prefetch port 1040 (step S603), and requests for a move-in to the secondary cache 1038 (step S604).

As explained above, according to the present procedure, when one entry is available in the MIBs, and when the command that causes a primary cache miss is only the command of the TOQ in the fetch port, the MIB controller 1041c assigns the primary cache MIBs 1036 and can request for a move-in to the primary cache 1034. When the command that causes a primary cache miss is another command, the MIB controller 1041c assigns the prefetch port 1040, and requests for a move-in to the secondary cache. Therefore, the memory control device 103 can obtain the effect of prefetch while avoiding the exclusive use of the primary cache MIBs 1036 by commands other than the TOQ according to the out-of-order processing.

Figure 7:
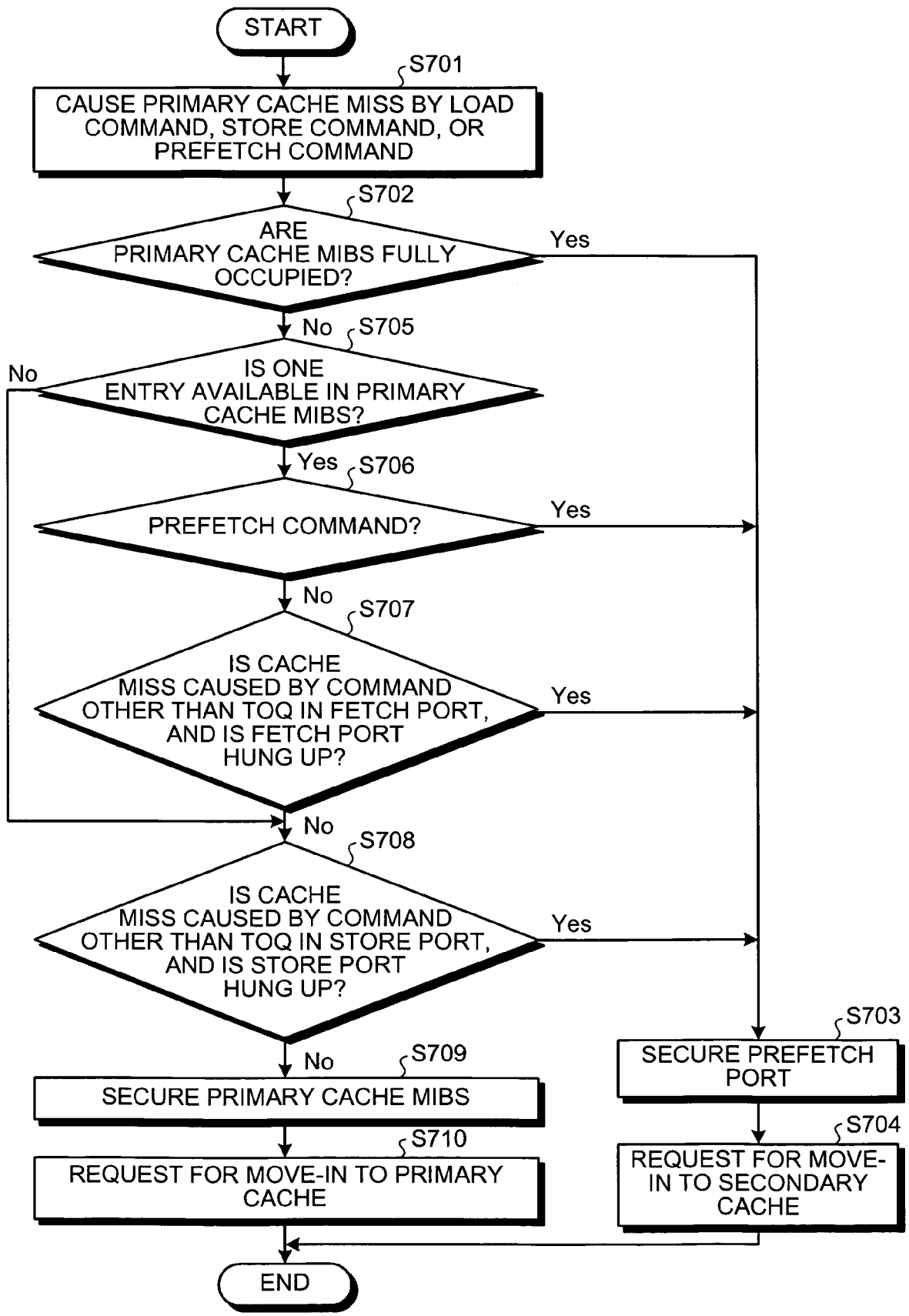
FIG. 7 is a flowchart of an MIB control procedure of a stalled execution of a load command and a store command by the MIB controller shown in FIG. 1.

The MIB control procedure of a stalled execution of a load command and a store command by the MIB controller 1041c shown in FIG. 1 is explained next with reference to FIG. 7. FIG. 7 is a flowchart of the MIB control procedure of a stalled execution of a load command and a store command by the MIB controller 1041c shown in FIG. 1. As shown in the drawing, when any one of a load command, a store command, and a prefetch command that is input to the pipeline of the primary cache causes a primary cache miss (step S701), the MIB controller 1041c confirms with the valid MIB detector 1041a whether the primary cache MIBs 1036 are fully occupied (step S702). The store command includes a detached store command.

When the primary cache MIBs 1036 are fully occupied (Yes at step S702), the MIB controller 1041c assigns the prefetch port 1040 (step S703), and requests for a move-in to the secondary cache 1038 (step S704).

On the other hand, when the primary cache MIBs 1036 are not fully occupied (No at step S702), the MIB controller 1041c further confirms with the valid MIB detector 1041a whether the number of available entry is one in the primary cache MIBs 1036 (step S705).

When two or more entries are available in the primary cache MIBs 1036 (No at step S705), the MIB controller 1041c further confirms with the command execution monitoring unit 1041d whether the store port 1032 is hung up due to a command that causes a primary cache miss (step S708).

When the store port 1032 is hung up due to a command other than the TOQ in the store port (Yes at step S708), the MIB controller 1041c assigns the prefetch port 1040 (step S703), and requests for a move-in to the secondary cache 1038 (step S704).

On the other hand, when the store port 1032 is not hung up or when the store port 1032 is hung up due to a command of the TOQ in the store port (No at step S708), the MIB controller 1041c assigns the primary cache MIBs 1036 (step S709), and requests for a move-in to the primary cache 1034 (step S710).

On the other hand, when one entry is available in the primary cache MIBs 1036 (Yes at step S705), the MIB controller 1041c further confirms whether the command that causes a primary cache miss is a prefetch command (step S706).

When the command that causes a primary cache miss is a prefetch command (Yes at step S706), the MIB controller 1041c assigns the prefetch port 1040 (step S703), and requests for a move-in to the secondary cache 1038 (step S704).

On the other hand, when the command that causes a primary cache miss is not a prefetch command (No at step S706), the MIB controller 1041c further confirms whether the command that causes a primary cache miss is the command of the TOQ in the prefetch port 1033 and the fetch port 1033 is hung up (step S707).

When the command that causes a primary cache miss is the command of the TOQ in the prefetch port 1033 or when the fetch port 1033 is not hung up (No at step S707), the MIB controller 1041c further confirms with the command execution monitoring unit 1041d whether the store port 1032 is hung up (step S708).

When the store port 1032 is hung up (Yes at step S708), the MIB controller 1041c assigns the prefetch port 1040 (step S703), and requests for a move-in to the secondary cache 1038 (step S704).

On the other hand, when the store port 1032 is not hung up or when the store port 1032 is hung up due to a command of the TOQ in the store port (No at step S708), the MIB controller 1041c assigns the primary cache MIBs 1036 (step S709), and requests for a move-in to the primary cache 1034 (step S710).

On the other hand, when the command that causes a primary cache miss is a command other than the command of the TOQ in the prefetch port 1033 and when the fetch port 1033 is hung up (Yes at step S707), the MIB controller 1041c assigns the prefetch port 1040 (step S703), and requests for a move-in to the secondary cache 1038 (step S704).

As explained above, according to the present procedure, when one entry is available in the MIBs, when a hang-up in the store port 1032 is not detected, when it is a command other than the command of the TOQ, and only when the command that causes a primary cache miss is the command of the TOQ in the fetch port 1033 or when the fetch port 1033 is not hung up, the MIB controller 1041*c* assigns the primary cache MIBs 1036, and can request for a move-in to the primary cache 1034. Otherwise, the MIB controller 1041*c* assigns the prefetch port 1040, and requests for a move-in to the secondary cache 1038. Therefore, when a hang-up of the fetch port 1033 is detected, the memory control device 103 shifts the processing from the out-of-order processing to the sequential processing. With this arrangement, at least one fetch processing request can be processed.

When a hang-up in the store port 1032 is detected, a command that causes a primary cache miss other than the TOQ in the store port assigns the prefetch port 1040, and requests for a move-in to the secondary cache 1038. Therefore, when a hang-up in the store port 1032 is detected, the memory control device 103 shifts the processing from the out-of-order processing to the sequential processing. With this arrangement, at least one store command can be processed.

As explained above, according to the first embodiment, the central processor 10 executes at least a load command to store data from the primary cache 1034, the secondary cache 1038, or the main storage 30 into the operation device 102, a store command to write a result of an operation carried out by the operation device 102 into the primary cache 1034, the secondary cache 1038, or the main storage 30, and a prefetch command to store data stored in the main storage 30 into the primary cache 1034 or the secondary cache 1038, based on the out-of-order processing for processing commands by changing the order of executing the commands. The valid MIB detector 1041*a* detects the number of the primary cache MIBs 1036 that hold requests of the primary cache 1034 for reference to data stored in the main storage 30. The MIB controller 1041*c* controls to hold reference requests according to the load command or the store command into the primary cache MIBs 1036 in preference to the reference requests according to the prefetch command, when the detected number of the primary cache MIBs 1034 reaches a predetermined number. Therefore, the memory control device 103 can avoid interruption of a load command or a store command that requires immediate completion of the execution by the prefetch command to prepare data that is considered to become necessary later. Consequently, reference to data stored in the main storage 30 can be controlled efficiently.

The MIB controller 1041*c* controls to hold reference requests according to a load command or a store command into the primary cache MIBs 1036 based on the order of executing the commands. Therefore, the memory control device 103 can avoid such a situation that a load request or a store request that must be executed first in executing the command cannot assign the primary cache MIBs 1036 and that the execution of the command is interrupted. Consequently, reference to data stored in the main storage 30 can be controlled efficiently.

The prefetch port 1033 holds a fetch processing request as a request for fetching data from the primary cache 1034, the secondary cache 1038, or the main storage 30. The command execution monitoring unit 1041*d* monitors the execution of the held fetch processing request. When a predetermined time delay in the prefetch processing is detected, the MIB controller 1041*c* controls to hold in the primary cache MIBs 1036 a reference request according to a fetch processing request that is stored for the longest time among the held fetch processing requests. When a predetermined time delay in the prefetch processing is not detected, the MIB controller 1041*c* controls to hold in the primary cache MIBs 1036 a reference request according to a fetch processing request. Therefore, the memory control device 103 can avoid such a situation that when a slashing of the cache line occurs, execution of a load request or a store request that must be executed first in executing the command must wait for a long time. Consequently, reference to data stored in the main storage 30 can be controlled efficiently.

The store port 1032 holds a store command. The command execution monitoring unit 1041*d* further monitors the execution of the held store command. When a predetermined time delay in the permission of writing of the store command is detected, the MIB controller 1041*c* controls to hold in the primary cache MIBs 1036 a reference request according to a store command that is stored for the longest time in the store port 1032 among the store commands. Therefore, the memory control device 103 can avoid such a situation that when a slashing of the cache line occurs, execution of a load request or a store request that must be executed first in executing the command must wait for a long time. Consequently, reference to data stored in the main storage 30 can be controlled efficiently.

The MIB controller 1041*c* controls to hold reference requests in the primary cache buffers, and transfers the reference requests other than the reference requests that are controlled to be held in the primary cache buffers from the primary cache to the secondary cache using a reference request transfer port. Therefore, when there is no room in the primary cache MIBs 1034 and when a succeeding command causes a cache miss, the memory control device 103 can request for a move-in from the main storage 30 to the secondary cache 1038. Consequently, reference to data stored in the main storage 30 can be controlled efficiently.

The memory control device and the move-in buffer control method explained in the first embodiment can be realized by executing a program prepared in advance with a computer system such as a personal computer or a workstation. In a second embodiment, the computer system that executes a move-in buffer control program that has the same function as that of the memory control device explained in the first embodiment is explained.

Figure 8:
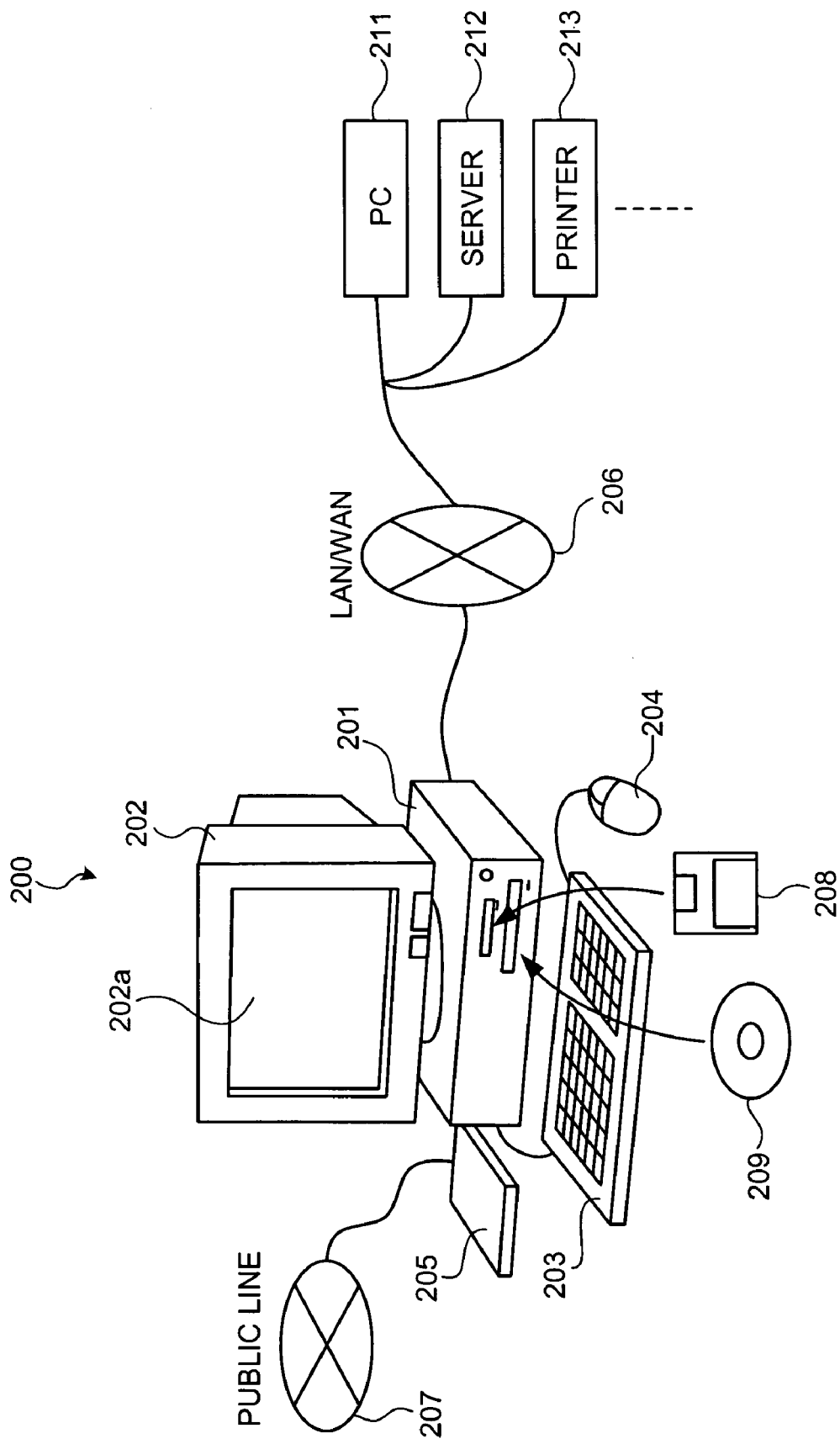
FIG. 8 is a configuration diagram of a computer system according to a second embodiment.
Figure 9:
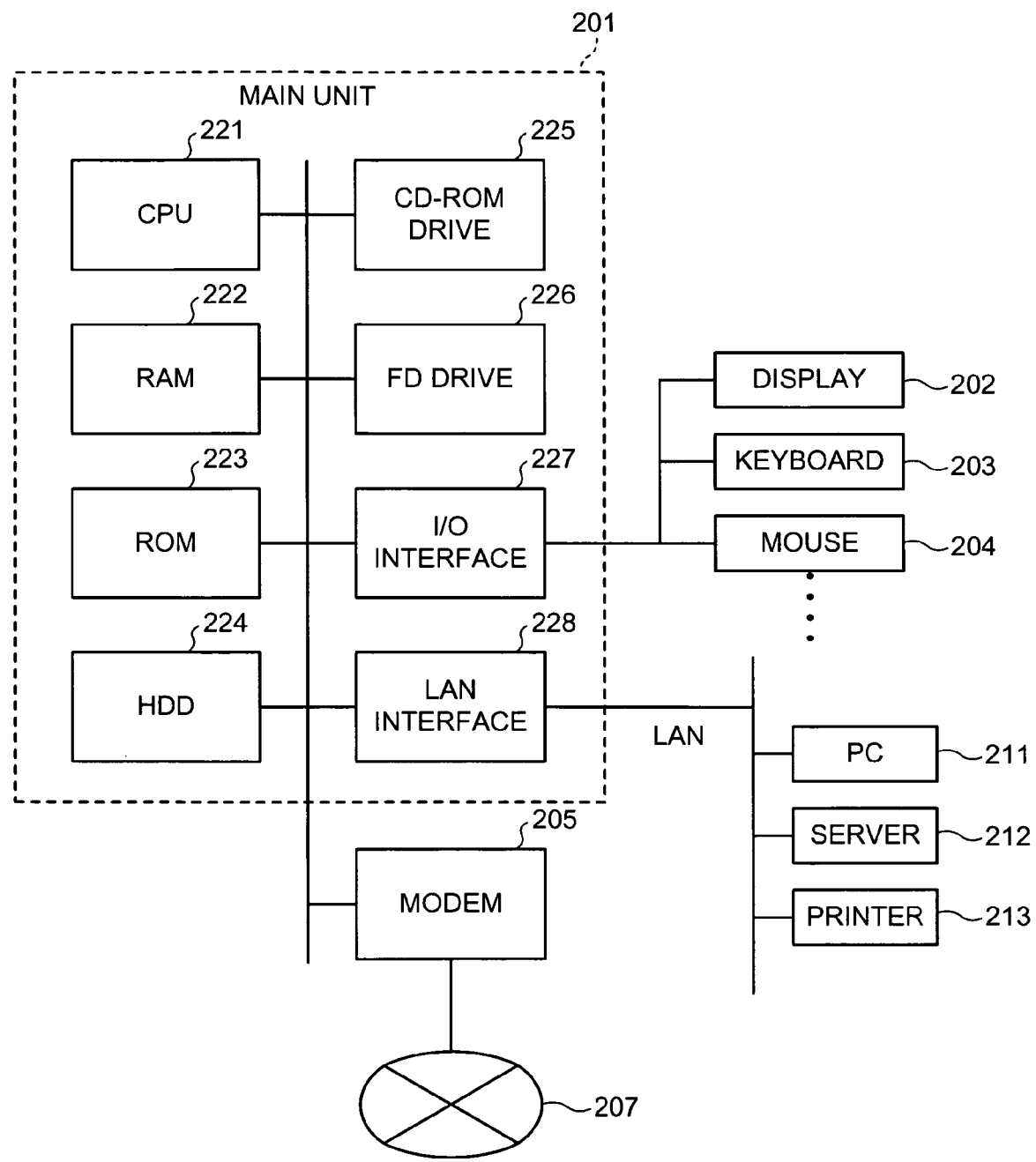
FIG. 9 is a block diagram of a configuration of a main unit in the computer system shown in FIG. 8.

FIG. 8 is a configuration diagram of the computer system according to the second embodiment. FIG. 9 is a block diagram of a configuration of a main unit in the computer system shown in FIG. 8. As shown in FIG. 8, a computer system 200 according to the second embodiment has a main unit 201, a display 202 that displays information such as an image on a display screen 202*a* according to an instruction from the main unit 201, a keyboard 203 from which various kinds of information are input to the computer system 200, and a mouse 204 that is used to specify an optional position on the display screen 202*a* of the display 202.

As shown in FIG. 9, the main unit 201 of the computer system 200 has a CPU 221, a RAM 222, a ROM 223, a hard disk drive (HDD) 224, a CD-ROM drive 225 that accommodates a CD-ROM 209, an FD drive 226 that accommodates a flexible disk (FD) 208, an I/O interface 227 that connects the main unit 201 with the display 202, the keyboard 203, and the mouse 204, and a LAN interface 228 that connects the main unit 201 with a local area network or a wide area network (LAN/WAN) 206.

The computer system 200 is connected with a modem 205 that is connected to a public line 207 such as the Internet, and is connected with another computer system (PC) 211, a server 212, and a printer 213 via the LAN interface 228 and the LAN/WAN 206.

The computer system 200 realizes a memory control device by reading and executing a move-in buffer control program that is recorded on a predetermined recording medium. The predetermined recording medium covers all recording mediums including "portable physical mediums" such as the flexible disk (FD) 208, the CD-ROM 209, an MO disk, a DVD disk, a magneto optical disk, and an IC card, "fixed physical mediums" such as the hard disk drive (HDD) 224, the RAM 222, and the ROM 223 that are provided inside and outside the computer system 200, and "communication mediums" that hold a program for a short period, at the time of transmitting the program, such as the public line 207 connected via the modem 205, and the LAN/WAN 206 connected to another computer system 211 and the server 212.

In other words, the move-in buffer control program is recorded onto the recording mediums such as the "portable physical mediums", the "fixed physical mediums", and the "communication mediums" such that the program can be read by the computer. The computer system 200 reads the move-in buffer control program from these recording mediums, and executes the program, thereby realizing the memory control device and the move-in buffer control method. The computer system 200 is not the only unit that executes the move-in buffer control program. The present invention can be also applied to the cases when another computer system 211 or the server 212 executes the move-in buffer control program, or this system and this server cooperate to execute the move-in buffer control program.

According to the present invention, a central processor executes at least a load command to store data from a cache or a main storage into an operation device, a store command to write a result of an operation by the operation device into the cache or the main storage, and a prefetch command to store data stored in the main storage into the cache, based on an out-of-order processing for processing commands by changing the order of executing the commands. The central processor detects the number of cache buffers that hold requests of the cache for reference to data stored in the main storage. When the detected number of the cache buffers reaches a predetermined number, the central processor holds the reference requests according to the load command or the store command into the cache buffers in preference to the reference requests according to the prefetch command. Therefore, a memory control device can avoid interruption of a load command or a store command that requires an immediate completion of the execution by the prefetch request to prepare data that is considered to become necessary later. Consequently, there is an effect that reference to data stored in the main storage can be controlled efficiently.

According to the present invention, reference requests according to a load command or a store command are held in the cache buffers based on the order of executing commands. Therefore, the memory control device can avoid such a situation that a load request or a store request that must be executed first in executing the command cannot assign the primary cache MIBs and that the execution of the command is interrupted. Consequently, there is an effect that reference to data stored in the main storage can be controlled efficiently.

According to the present invention, a prefetch processing request for fetching data from the cache or the main storage is held, and the execution of the held prefetch processing request is monitored. When a predetermined time delay in the prefetch processing is detected, a reference request according to a fetch processing request that is stored for the longest time among the held fetch processing requests is controlled to be held in the cache buffer. When a predetermined time delay in the prefetch processing is not detected, a reference request according to a fetch processing request is controlled to be held in the cache buffer. Therefore, the memory control device can avoid such a situation that when a slashing of the cache line occurs, execution of a load request or a store request that must be executed first in executing the command must wait for a long time. Consequently, there is an effect that reference to data stored in the main storage can be controlled efficiently.

According to the present invention, a store command is held, and the execution of the held store command is monitored. When a predetermined time delay in the permission of writing of the store command is detected, a reference request according to a store command that is stored for the longest time in the store port among the store commands is controlled to be held in the cache buffer. Therefore, the memory control device can avoid such a situation that when a slashing of the cache line occurs, execution of a load request or a store request that must be executed first in executing the command must wait for a long time. Consequently, there is an effect that reference to data stored in the main storage can be controlled efficiently.

According to the present invention, reference requests are controlled to be held in the primary cache buffers, and reference requests other than the reference requests that are controlled to be held in the primary cache buffers are transferred from the primary cache to the secondary cache using a reference request transfer port. Therefore, when there is no room in the primary cache buffers and when a succeeding command causes a cache miss, the memory control device can request for a move-in from the main storage to the secondary cache. Consequently, there is an effect that reference to data stored in the main storage can be controlled efficiently.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A memory control device provided between a main storage and a command processing device and an operation device included in a central processor, the memory control device controlling reference from the command processing device and the operation device to data stored in the main storage, the memory control device comprising:

a plurality of caches that store data stored in the main storage and address information corresponding to the data; and a plurality of cache buffers that hold address information of requests of the caches for reference to data stored in the main storage, wherein the central processor executes at least a load command to store data from the caches or the main storage into the operation device, a store command to write a result of an operation carried out by the operation device into the caches or the main storage, and a prefetch command to store data stored in the main storage into the caches, based on an out-of-order processing for processing commands by changing the order of executing the commands, and the memory control device includes:

a valid move-in buffer detector that detects a number of the cache buffers that hold requests of the cache for reference to data stored in the main storage; and a buffer controller that controls to hold in the cache buffers the reference requests according to the load command or the store command in preference to the reference requests according to the prefetch command, when the detected number of the cache buffers reaches a predetermined number, a fetch port as a buffer that holds a fetch processing request to fetch data from the caches or the main storages; and a command execution monitoring unit that monitors the execution of the fetch processing request held in the fetch port, wherein when the command execution monitoring unit detects a predetermined time delay in the fetch processing, the buffer controller controls to hold in the cache buffer the reference request according to a fetch processing request that is stored for the longest time in the fetch port among the fetch processing requests, and when the command execution monitoring unit does not detect a predetermined time delay in the fetch processing, the buffer controller controls to hold in the cache buffers the reference requests according to the fetch processing request.

2. The memory control device according to claim 1, wherein the buffer controller controls to hold in the cache buffers the reference requests according to the load command or the store command based on the order of executing the commands.

3. The memory control device according to claim 1, further comprising a store port as a buffer that holds store commands, wherein the command execution monitoring unit monitors the execution of a store command held in the store port, and when the command execution monitoring unit detects a predetermined time delay in the permission of writing of the store command, the buffer controller controls to hold in the cache buffers the reference request according to a store command that is stored for the longest time in the store port among the store commands.

4. The memory control device according to claim 1, wherein the cache includes a secondary cache that stores data stored in the main storage and address information corresponding to the data, and a primary cache that stores data stored in the secondary cache and address information corresponding to the data, the cache buffer includes a secondary cache buffer that holds a request of the secondary cache for reference to data stored in the main storage, and a primary cache buffer that holds a request of the primary cache for reference to data stored in the secondary cache, the memory control device further comprises a reference request transfer port as a buffer that holds the reference request to be transferred from the primary cache to the secondary cache, and when there is no room in the primary cache buffer for a reference request other than reference requests that are controlled to be held in the cache buffer, the buffer controller controls to hold in the primary cache buffer the reference request that is controlled to be held in the cache buffer, transfers the reference requests other than reference requests that are controlled to be held in the cache buffer from the primary cache to the secondary cache using the reference request transfer port, and makes the reference request transfer port start to store data stored in the main storage in the secondary cache as well as deterring the primary cache from storing data from the secondary cache, and when there is room in the primary cache buffer after the reference request transfer port started to store the data in the secondary cache, the buffer controller requests to store the data stored in the secondary cache in the primary cache via the primary cache buffer.

5. A method of controlling a move-in buffer, the method being executed on a memory control device provided between a main storage and a command processing device and an operation device included in a central processor, the memory control device controlling reference from the command processing device and the operation device to data stored in the main storage, and the memory control device including a plurality of caches that store data stored in the main storage and address information corresponding to the data; and a plurality of cache buffers that hold address information of requests of the caches for reference to data stored in the main storage, wherein the central processor executes at least a load command to store data from the caches or the main storage into the operation device, a store command to write a result of an operation carried out by the operation device into the caches or the main storage, and a prefetch command to store data stored in the main storage into the caches, based on an out-of-order processing for processing commands by changing the order of executing the commands, and the method comprising:

detecting a number of the cache buffers that hold requests of the cache for reference to data stored in the main storage;

controlling to hold in the cache buffers the reference requests according to the load command or the store command in preference to the reference requests according to the prefetch command, when the number of the cache buffers detected reaches a predetermined number;

holding, a fetch port as a buffer, a fetch processing request to fetch data from the caches or the main storages; and monitoring the execution of the fetch processing request held in the fetch port, wherein when a predetermined time delay is detected in the monitoring in the fetch processing, the controlling includes controlling to hold in the cache buffer the reference request according to a fetch processing request that is stored for the longest time in the fetch port among the fetch processing requests, and when a predetermined time delay is not detected in the monitoring in the fetch processing, the controlling includes controlling to hold in the cache buffers the reference requests according to the fetch processing request.

6. The method according to claim 5, wherein the controlling includes controlling to hold the reference requests according to the load command or the store command into the cache buffers based on the order of executing the commands.

7. The method according to claim 5, further comprising holding a store port as a buffer that holds store commands, wherein the monitoring includes monitoring the execution of a store command held in the store port, and when the predetermined time delay is detected in the monitoring in the permission of writing of the store command, the controlling includes controlling to hold in the cache buffers the reference request according to a store command that is stored for the longest time in the store port among the store commands.

8. The method according to claim 5, wherein the cache includes a secondary cache that stores data stored in the main storage and address information corresponding to the data, and a primary cache that stores data stored in the secondary cache and address information corresponding to the data, the cache buffer includes a secondary cache buffer that holds a request of the secondary cache for reference to data stored in the main storage, and a primary cache buffer that holds a request of the primary cache for reference to data stored in the secondary cache, the method further comprising holding the reference request to be transferred from the primary cache to the secondary cache in a reference request transfer port, which is a buffer, and the controlling includes, when there is no room for reference requests other than reference requests that are controlled to be held in the cache buffer, controlling to hold in the primary cache buffer the reference request that is controlled to be held in the cache buffer, transferring the reference requests other than reference requests that are controlled to be held in the cache buffer from the primary cache to the secondary cache using the reference request transfer port, and making the reference request transfer port start to store data stored in the main storage in the secondary cache as well as deterring the primary cache from storing data from the secondary cache, and when there is room in the primary cache buffer after the reference request transfer port started to store data in the secondary cache, requesting to store the data stored in the secondary cache in the primary cache via the primary cache buffer.

* * * * *